(12) United States Patent
Hagerman et al.

(10) Patent No.: US 11,277,323 B1
(45) Date of Patent: Mar. 15, 2022

(54) SYSTEMS AND METHODS FOR DISTRIBUTED MEASUREMENT COLLECTION AND ANALYSIS

(71) Applicant: JPMorgan Chase Bank, N.A., New York, NY (US)

(72) Inventors: Steve Hagerman, Sunbury, OH (US); Brian R. Pennell, Galena, OH (US); Dan J. Gaier, Powell, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 581 days.

(21) Appl. No.: 14/994,792

(22) Filed: Jan. 13, 2016

(51) Int. Cl.
*H04L 12/26* (2006.01)
*H04L 29/08* (2006.01)
*H04L 43/08* (2022.01)
*H04L 43/04* (2022.01)
*H04L 43/065* (2022.01)
*H04L 67/06* (2022.01)

(52) U.S. Cl.
CPC .............. *H04L 43/08* (2013.01); *H04L 43/04* (2013.01); *H04L 43/065* (2013.01); *H04L 67/06* (2013.01)

(58) Field of Classification Search
CPC ....... H04L 43/08; H04L 43/04; H04L 43/065; H04L 67/06
See application file for complete search history.

(56) References Cited

U.S. PATENT DOCUMENTS

| | | | | |
|---|---|---|---|---|
| 7,162,390 | B2 * | 1/2007 | Jowett | G06F 11/3616 |
| | | | | 702/182 |
| 2011/0246826 | A1 * | 10/2011 | Hsieh | G06F 11/3476 |
| | | | | 714/20 |
| 2014/0280899 | A1 * | 9/2014 | Brewster, Jr | H04L 43/0817 |
| | | | | 709/224 |
| 2015/0326447 | A1 * | 11/2015 | Yoon | H04L 43/10 |
| | | | | 709/224 |
| 2017/0171041 | A1 * | 6/2017 | Knowler | H04L 43/045 |

* cited by examiner

*Primary Examiner* — Philip J Chea
*Assistant Examiner* — Mohammed Ahmed
(74) *Attorney, Agent, or Firm* — Greenberg Traurig LLP

(57) ABSTRACT

Systems and methods for distributed measurement collection and analysis are disclosed. In one embodiment, a method for distributed measurement collection and analysis may include (1) receiving, at a local server within a wide area computer network, a file from an electronic device within the wide area computer network, the file comprising a plurality of metrics for the electronic device over a period comprising a plurality of first intervals, wherein the file is received at a second interval; (2) the local server the local server analyzing the file for at least one maintenance issue for the electronic device; and (3) the local server providing the file to the central server at a third interval, the central server outside the wide area network.

14 Claims, 2 Drawing Sheets

SYSTEMS AND METHODS FOR DISTRIBUTED MEASUREMENT COLLECTION AND ANALYSIS

BACKGROUND OF THE INVENTION

1. Field of the Invention

The present invention generally relates to systems and methods for distributed measurement collection and analysis.

2. Description of the Related Art

In a distributed network environment, monitoring agents typically stream data to a central service for analytics, such as Dynatrace Application Monitoring, Splunk, etc.). In general, this stream consumes too much bandwidth for highly distributed retail operations, connected via low bandwidth Wide Area Networks.

SUMMARY OF THE INVENTION

Systems and methods for distributed measurement collection and analysis are disclosed. In one embodiment, a system for distributed measurement collection and analysis may include a local network comprising: a local server and a plurality of electronic devices in communication with the local server, each electronic device comprising a computer processor executing a monitoring program for collecting at least one metric; a central server in communication with the local server, the central server outside the wide area network. The monitoring program executed by each of the plurality of electronic devices may collect the at least one metric from the electronic device at a first interval; the monitoring program may aggregate the at least one metric collected over a plurality of first intervals into a file; the monitoring program may communicate the file to the local server at a second interval; the local server may analyze the file for at least one maintenance issue; and the local server may provide the file to the central server at a third interval.

In one embodiment, the at least one metric is a performance metric for the electronic device. The performance metric may be at least one of average disk read times, average disk write time, available memory, output queue length for a network interface, processor queue length, and processor usage.

In another embodiment, the at least one metric may be an application metric for at least one application executed by the electronic device. The application metric may be one of an application identifier, a user identifier, a number of page views, a number of clicks, a number of events, and a timestamp.

In one embodiment, the local server may communicate an identified maintenance issue to the central server upon identification.

In one embodiment, third interval is based on a bandwidth availability between the local server and the central server.

In one embodiment, the central server may automatically transmit a program to the electronic device in response to the maintenance issue and/or dispatch a technician to the electronic device.

In one embodiment the system may further include at least one computer processor in communication with the central server that determines an impact of at least one of a software update and a software rollout on at least one electronic device based on the received file.

According to another embodiment, a method for distributed measurement collection and analysis may include (1) receiving, at a local server within a wide area computer network, a file from an electronic device within the wide area computer network, the file comprising a plurality of metrics for the electronic device over a period comprising a plurality of first intervals, wherein the file is received at a second interval; (2) the local server the local server analyzing the file for at least one maintenance issue for the electronic device; and (3) the local server providing the file to the central server at a third interval, the central server outside the wide area network.

In one embodiment, the at least one metric is a performance metric for the electronic device. The performance metric may be at least one of average disk read times, average disk write time, available memory, output queue length for a network interface, processor queue length, and processor usage.

In another embodiment, the at least one metric may be an application metric for at least one application executed by the electronic device. The application metric may be one of an application identifier, a user identifier, a number of page views, a number of clicks, a number of events, and a timestamp.

In one embodiment, the local server may communicate an identified maintenance issue to the central server upon identification.

In one embodiment, the third interval is based on a bandwidth availability between the local server and the central server.

According to another embodiment, a method for distributed measurement collection and analysis may include (1) receiving, at a central server and from a local server in a wide area computer network, a file from an electronic device within the wide area computer network, the file comprising a plurality of metrics for the electronic device over a period comprising a plurality of first intervals, the central server outside the wide area network; and (2) at least one computer in communication with the central determining an impact of at least one of a software update and a software rollout on at least one electronic device based on the received file.

In one embodiment, the at least one metric is a performance metric for the electronic device. The performance metric may be at least one of average disk read times, average disk write time, available memory, output queue length for a network interface, processor queue length, and processor usage.

In another embodiment, the at least one metric may be an application metric for at least one application executed by the electronic device. The application metric may be one of an application identifier, a user identifier, a number of page views, a number of clicks, a number of events, and a timestamp.

In one embodiment, the method may further include the central server automatically transmitting a software update to the electronic device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
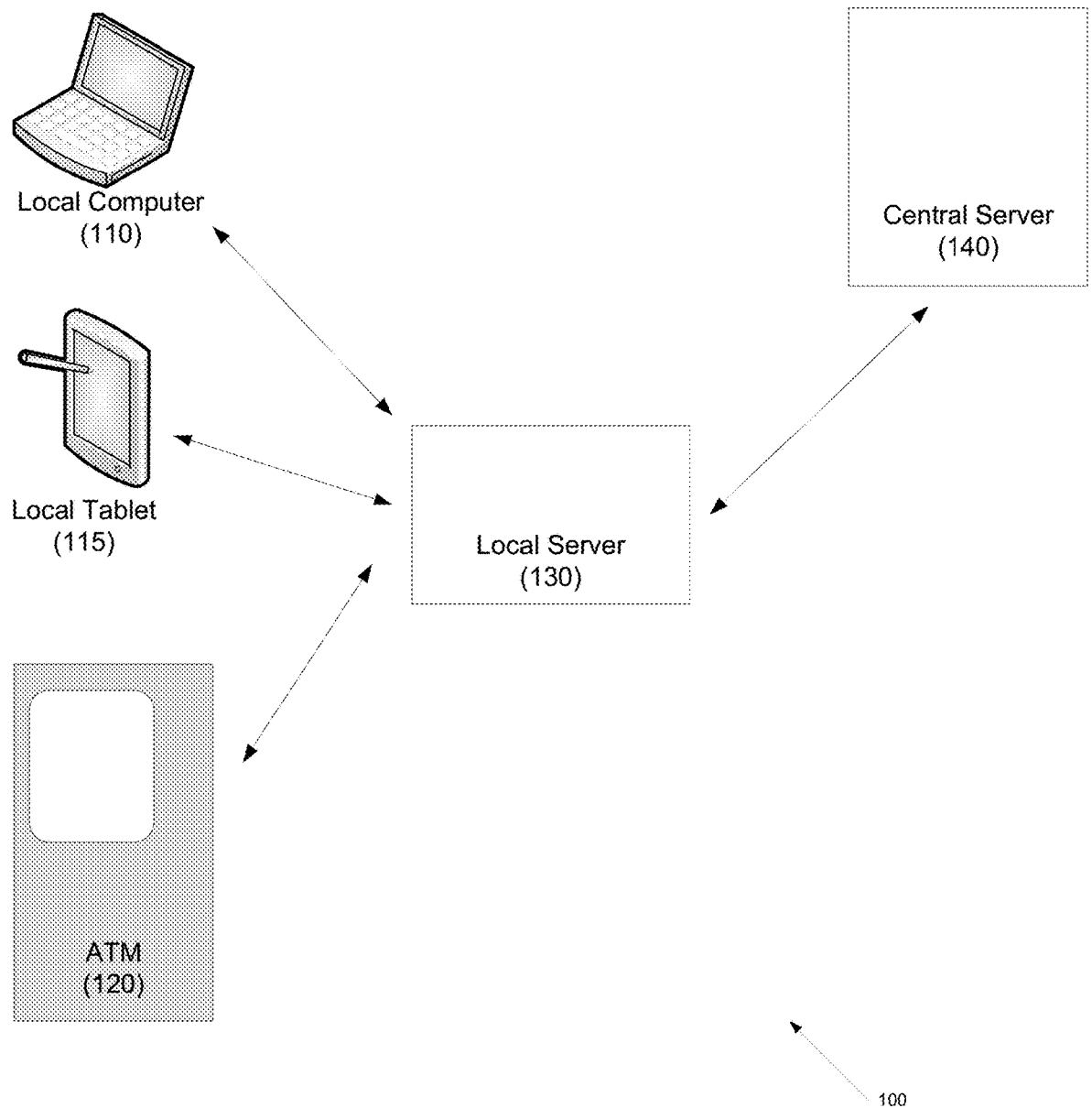
FIG. 1 depicts a system for distributed measurement collection and analysis according to one embodiment.
Figure 2:
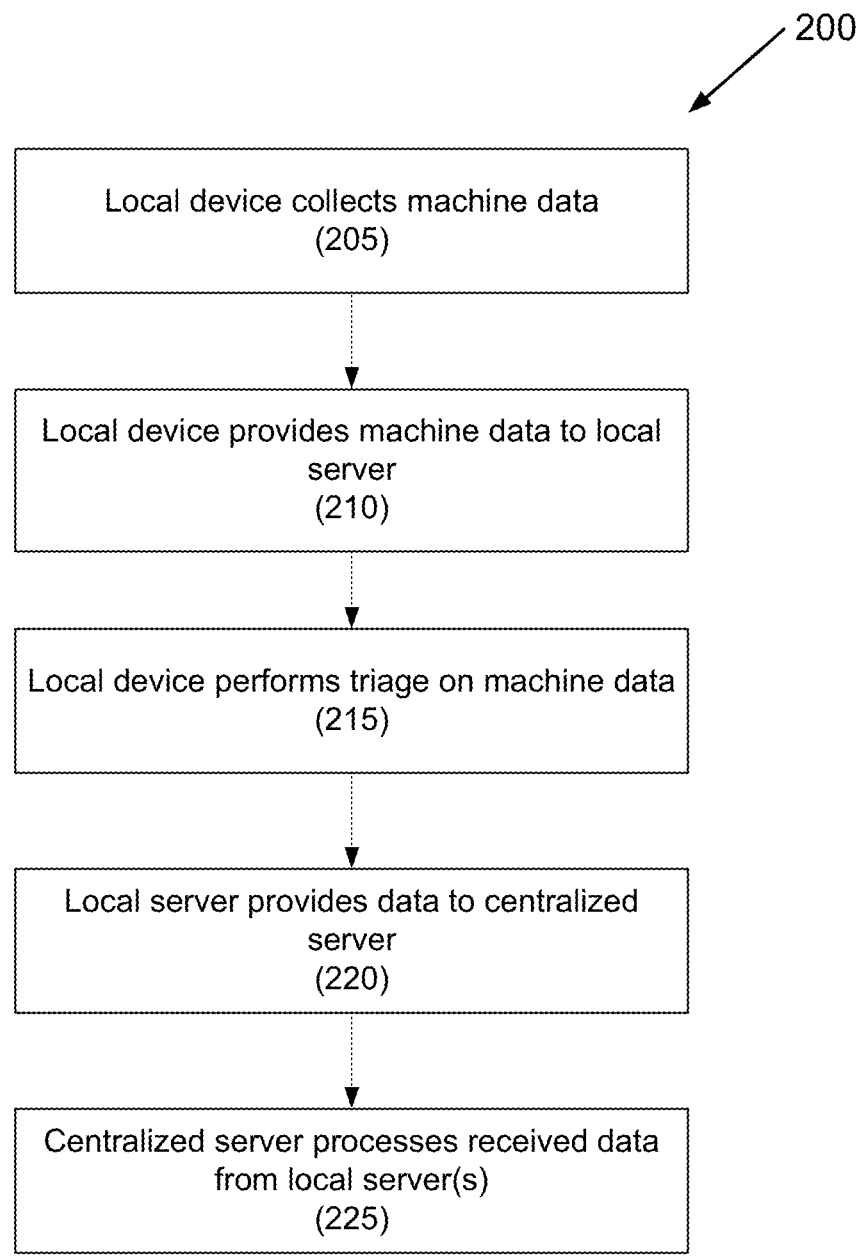
FIG. 2 depicts a method for distributed measurement collection and analysis according to one embodiment.

Several embodiments of the present invention and their advantages may be understood by referring to FIGS. 1-2.

Embodiments relate to a local collection and analytics service for a network of distributed machines. In one embodiment, a service may be provided for and run on local machines (e.g., computers, ATMs, etc.) that may collect data, such as performance metrics, from the local machines. The service may report these performance metrics to a local server. For example, the local server may provide a web service that receives these files.

Applications executed by the local machines may be provided with Application Programmable Interfaces (API) to post events.

The local server may be provided with a real-time, or substantially real-time, analytics process that may be executed by the local server and may provide alerts when certain thresholds are breached. The breaches may be communicated over the Wide Area Network (WAN) so that service technicians may be dispatched, service requests may be generated, etc.

In one embodiment, a central server may executed a process, such as a batch process, that pulls performance metrics and/or the local servers evaluation of the performance metrics from the local server. In one embodiment, the central server may perform the same and/or additional analytics on the performance metrics and/or evaluation data.

Referring to FIG. 1, a system for distributed measurement collection and analysis according to one embodiment is disclosed. System 100 may include local machines/devices, such as local computer 110, local tablet 115, and ATM 120. These machines/devices are exemplary only; the actual machines/devices may vary depending on the nature of the local facility. For example, the machines/devices in FIG. 1 are typical machines/devices found in a bank branch. For other local facilities (e.g., merchants, medical facilities, government facilities, schools, etc.), other machines/devices may be provided as is necessary and/or desired. In one embodiment, machines/devices may include peripheral devices, such as printers, print servers, phone systems, scanners, cash recyclers, security systems, etc.

It should be recognized that although three local machines/devices are depicted in FIG. 1, any number of local machines/devices, different/additional types of machines/devices, etc. may be provided as is necessary and/or desired.

Local machines/devices 110, 115, and 120 may be part of a wide area network that may include local server 130. Local server 130 may be any suitable server that may communicate with local machines/devices 110, 115, and 120 and central server 140. In one embodiment, local server 130 may function as a gateway between the WAN and central server 140.

In one embodiment, the bandwidth between central server 140 and local server 130 may be limited such that it does not provide sufficient bandwidth for business traffic (e.g., traffic to/from local machines/devices 110, 115, and 120) and traffic related to the health/performance monitoring of machines/devices 110, 115, and 120. In one embodiment, the addition of device/machine monitoring traffic may adversely affect the performance of the business functions.

In one embodiment, local machines/devices 110, 115, and 120 may execute a service (not shown) that may collect metrics from each machine/device. For example, operating, performance, and application metrics may be collected. In one embodiment, the service may collect snapshots of one or more desired metric at a first interval, and these snapshots may be aggregated and reported to local server 130 at a second interval.

Example metrics that may be collected include average disk read times and average disk write times for logical and/or physical disks, available memory, the output queue length for the network interface, the processor queue length, and processor usage. Other metrics may be captured as is necessary and/or desired.

In one embodiment, the service, an API, or other desktop service may monitor application(s) executed by the machines/devices 110, 115, and 120. In one embodiment, the service may monitor one or more of the following: an application identifier, a user identifier, page tracking information (page views, clicks, events, timestamps, etc.), etc.

In one embodiment, the performance of the operating system, programs, applications, etc. that are executed on machines/devices 110, 115, and 120 may be monitored. For example, application launch times, responsiveness, errors, crashes, etc. may be monitored and collected.

In still another embodiment, the service may also monitor/track events on the machines/devices.

Local server 130 may receive the performance data, the application data, and/or any other data from local machines/devices 110, 115 and 120. In one embodiment, local server 130 may compare current performance data stored on local server 130 against certain thresholds in order to identify machines/devices that may require attention. In one embodiment, other data may be joined in the backend systems.

In one embodiment, central server 140 may receive data from local server 130. In one embodiment, central server 140 may receive an identification of any machines/devices that may require attention, machine/device information, etc. In another embodiment, central server 140 may receive one or more snapshots for one or more local machine/device. In another embodiment, central server 140 may receive data regarding how an application performs on one or more machine/device.

In one embodiment, local server 130 may provide data to central server 140 during periods of low bandwidth use, such as at night, weekends, etc. In one embodiment, routine data may be provided in this manner. In another embodiment, local server 130 may provide data to the central server 140 when a machine/device needs attention (e.g., an ATM has gone offline). Any timing and method of providing some or all data to the central server may be used as is necessary and/or desired.

Examples of data that may be received by central server 140 include an identification of/number of logged on users (current and/or past), branch office location and hours, HR employee hierarchy and data, network consumption, backend service performance data, OEM data, current/future software efficiency/usage projections, current/future software simulations/benchmarks, etc.

In one embodiment, the data may be collected and presented to the user. In one embodiment, the data may be presented graphically.

In one embodiment, central server 140 may automatically schedule maintenance and/or service, order replacement machines/devices, order parts, initiate communications, provide notifications, deploy application, updates, and patches, disable applications, etc. based on the data received. In general, central server 140 may perform any suitable scriptable function that can be initiated based on events or criteria that they meet.

In another embodiment, central server 140 may request addition information on a machine/device 130.

In one embodiment, service technicians may be automatically dispatched to machines/devices 110, 115, 120 requiring attention, incident tickets may be automatically opened, etc.

Referring to FIG. 2, a method for distributed measurement collection and analysis according to one embodiment is disclosed. In step 205, a service may be executed by a local machine/device to collect machine data. As discussed above, this data may include performance data (e.g., reliability data, fault data, etc.), hardware data (e.g., hardware information, fault information, usage information, reliability data, etc.), application data, etc.

In one embodiment, application data, such as application identifiers, user identifiers, time stamps, events (e.g., page views, clicks, events, timestamps, custom events, etc.), and any other machine data necessary and/or desired may be collected.

Other machine data may be collected as is necessary and/or desired.

In one embodiment, the machine data may be collected at an interval, such as every 15 seconds. The specific interval may be set as is necessary and/or desired. In another embodiment, the machine data may be collected as required.

In one embodiment, the data may be collected as a "snapshot" of the current operational, performance, and/or application status of the machine/device.

In one embodiment, the collected data may be aggregated into one or more files.

In one embodiment, the service on the local device may perform an analysis on the data it collects in order to determine the status of that machine/device. In one embodiment, this may be performed to determine whether any immediate alerts, notifications, or service requests are necessary.

In step 210 the service on the local device may periodically provide the file comprising the aggregated data to a local server. For example, the local device may provide the file every 15 minutes. Any suitable time period may be used as necessary and/or desired. In one embodiment, the file may be provided when a certain condition exists (e.g., local device failure, etc.).

In step 215, the service on the local device may perform a triage, or analysis, on the data it collects in order to determine the status of that machine/device. In one embodiment, this analysis may be performed to determine whether any immediate alerts, notifications, or service requests are necessary.

In one embodiment, certain thresholds for certain parameters (e.g., CPU usage, memory usage, disk read/write time, network connectivity, etc.) may be used in the triage. In one embodiment, the parameters may be set at the central server, at the local server, and/or at the machine/device.

In one embodiment, the local server may combine the files from multiple local devices into a single file, and may compress that file before it is uploaded to the central server. In one embodiment, the multiple file from one device may be combined into a single file.

In step 220, the local server may provide data the devices in the WAN to a central server. In embodiment, the local server may provide the data to the central server periodically, for example, during periods of low bandwidth use (e.g., nights, weekends, etc.). In another embodiment, the local server may provide the data to the central server when a machine/device needs attention (e.g., an ATM has gone offline). Any timing and method of providing some or all data to the central server may be used as is necessary and/or desired.

In step 225, the central server may process the received data. In one embodiment, the central server may automatically schedule maintenance and/or service, order replacement machines/devices, order parts, provide notifications, deploy application, updates, and patches, disable applications, etc. based on the data received. In another embodiment, the central server may request addition information on a machine/device.

In one embodiment, the central server may retrieve business rules to apply during the analysis of the data.

In one embodiment, the data received by the central server may be used to assess the operational status of one or more machine/device. In one embodiment, the data may be used to analyze the impact of a software or update rollout, machine/device age, etc. In one embodiment, the data may be used to simulate the deployment of an application, an update, etc. on a machine/device in order to evaluate how the application is likely to perform on the machine. For example, in the performance environment, it may be observed that an application that typically consumed 40% of CPU resources is consuming 50% after an update. That 10% increase may be modeled against similar machines/devices that run this software to assess if there is sufficient headroom at the edge client to deploy the update.

For example, an agent/agent(s) may be loaded onto devices during functional and load testing. Baseline profiles may be built, demonstrating how the software is performing on the client device, with correlation between hardware performance and user interface activity. When new software is installed, updated, etc. new profiles may be captured and compared to determine the impact of the new software, update, etc. on the device.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 10 operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for distributed measurement collection and analysis, comprising:
   a wide area network comprising:
      a local server; and
      a plurality of electronic devices in communication with the local server, each electronic device comprising a computer processor executing a monitoring program for collecting an electronic device performance metric and an application metric, wherein a software application is deployed to each electronic device to be independently executed by the electronic device; and
   a central server in communication with the local server via a second network, the central server outside the wide area network;
   wherein:
      the monitoring program executed by each of the plurality of electronic devices collects the electronic device performance metric and the application metric associated with the software application from the electronic device on which the monitoring program executes at a first interval;
      the monitoring program aggregates the electronic device performance metrics and the application metrics collected over a plurality of first intervals into a file;
      the monitoring program communicates the file to the local server at a second interval;
      the local server analyzes the file from each electronic device and determines that the files contain routine data;
      the local server aggregates the files from each electronic device into a single file;
      the local server identifies a period of low bandwidth use on the second network;
      the local server provides the single file to the central server during the period of low bandwidth use; and
      the local server communicates an identified maintenance issue to the central server upon identification.

2. The system of claim 1, wherein the electronic device performance metric comprises an average disk read time, an average disk write time, an available memory, an output queue length for a network interface, a processor queue length, and/or a processor usage.

3. The system of claim 1, wherein the application metric comprises an application identifier, a user identifier, a number of page views, a number of clicks, a number of events, and/or a timestamp.

4. The system of claim 1, wherein the central server automatically performs transmitting a program to the electronic device in response to the identified maintenance issue and/or dispatching a technician to the electronic device.

5. The system of claim 1, further comprising:
   at least one computer processor in communication with the central server determining an impact of the software application being updated on the electronic device or the software application being rolled out on electronic device based on the file.

6. A method for distributed measurement collection and analysis, comprising:

receiving, at a local server within a wide area computer network, a file from an electronic device within the wide area computer network, the electronic device independently executing a software application, the file comprising a plurality of electronic device performance metrics and a plurality of application metrics for the electronic device over a period comprising a first interval, wherein the file is received at a second interval, the plurality of electronic device performance metrics and the plurality of application metrics collected and aggregated by a monitoring program executed by the electronic device on which the monitoring program is executed;

the local server analyzing the file from each electronic device and determines that the files contain routine data;

the local server aggregating the file from each electronic device into a single file;

the local server identifying a period of low bandwidth use on a second network;

the local server providing the aggregated file to a central server during the period of low bandwidth use; and the local server communicating an identified maintenance issue to the central server upon identification.

7. The method of claim 6, wherein the electronic device performance metrics comprises at least one of average disk read times, average disk write time, available memory, output queue length for a network interface, processor queue length, and processor usage.

8. The method of claim 6, wherein the monitoring program is executed by a plurality of electronic devices collecting respective electronic device performance metrics the software application executed independently by each of the electronic devices.

9. The method of claim 8, wherein the electronic device performance metrics comprises an application identifier, a user identifier, a number of page views, a number of clicks, a number of events, and/or a timestamp.

10. The method of claim 6, wherein the local server communicates an identified maintenance issue to the central server upon identification.

11. A method for distributed measurement collection and analysis, comprising:

receiving, at a central server and from a local server in a wide area computer network and during a period of low bandwidth use, an aggregated file comprising a plurality of files, each file from an electronic device within the wide area computer network, each electronic device independently executing a software application, the file comprising routine data comprising a plurality of electronic device performance metrics and a plurality of application metrics for the electronic device over a period comprising a first interval, the central server outside the wide area network, the plurality of electronic device performance metrics and the plurality of application metrics collected by a monitoring program executed by each electronic device on which the monitoring program is executed;

determining a baseline profile associated with the electronic device;

determining a new profile based on the file;

determining, by at least one computer in communication with the central server, an impact of at least one of a software update to the software application and a software rollout of the software application on at least one electronic device based on the baseline profile and new profile; and receiving, by the central server, identified maintenance issue from the local server upon identification.

12. The method of claim 11, wherein the electronic device performance metrics comprise an average disk read time, an average disk write time, an available memory, an output queue length for a network interface, a processor queue length, and/or a processor usage.

13. The method of claim 11, wherein the electronic device performance metrics comprises an application identifier, a user identifier, a number of page views, a number of clicks, a number of events, and/or a timestamp.

14. The method of claim 11, further comprising:

the central server automatically transmitting a software update of the software application to the electronic device based on the file.

* * * * *